United States Patent [19]
Price et al.

[11] 3,825,934
[45] July 23, 1974

[54] SCRATCH STRAIN RECORDER
[75] Inventors: Ronald Price, Hazeldean, Ontario;
 Jozsef W. Kelemen, Ottawa, Ontario, both of Canada
[73] Assignee: Leigh Instruments Limited, Carleton Place, Ontario, Canada
[22] Filed: May 2, 1973
[21] Appl. No.: 356,634

[52] U.S. Cl. .................. 346/7, 346/77 R, 346/118, 346/136
[51] Int. Cl. ......................... G01c 7/04, G01d 9/38
[58] Field of Search ................ 346/7, 77, 118, 136; 226/146, 147; 242/157.1; 74/89, 25, 89.12; 73/88 R

[56] References Cited
UNITED STATES PATENTS

| | | | |
|---|---|---|---|
| 2,081,579 | 5/1937 | DeForest | 346/77 R |
| 2,932,967 | 4/1960 | Prewitt et al. | 346/77 R |
| 3,164,983 | 1/1965 | Perkins et al. | 346/7 |
| 3,235,875 | 2/1966 | Mails | 346/136 X |
| 3,289,189 | 11/1966 | Clark et al. | 346/136 X |
| 3,331,078 | 7/1967 | Howland | 346/77 R |
| 3,430,250 | 2/1969 | Prewitt et al. | 346/7 |
| 3,618,115 | 11/1971 | Aagarb | 346/7 |
| 3,725,948 | 4/1973 | Prewitt et al. | 346/77 R |

*Primary Examiner*—Richard B. Wilkinson
*Assistant Examiner*—Vit W. Miska
*Attorney, Agent, or Firm*—Hill, Gross, Simpson, Van Santen, Steadman, Chiara & Simpson

[57] ABSTRACT

A scratch strain recorder is disclosed which is comprised of a support assembly and a recording head assembly. The recording head assembly includes a recording tape storage means and a recording tape transport means. A recording element is provided comprising an arm and a recorder stylus. One end of the arm is fixed to the support assembly with the other end of the arm carrying the recorder stylus and urging the stylus against a recording tape at a recording station within the recording head assembly. The device further comprises a rotational drive source means connected between the support assembly and the recording head assembly. The recording tape transport means comprises a unidirectional drive connected at one end to the rotational drive source means an operatively associated at its other end with the tape for transporting said tape in one longitudinal direction past the recording station. The rotational drive source means is comprised of an H-shaped or a U-shaped element. An element of either shape has two longitudinal members which are transversely bowed, and a connecting member. Relative longitudinal motion between the support assembly and the recording head assembly causes an increase or a decrease in the bows of the longitudinal members which in turn causes a rotational motion of the connecting member. The unidirectional drive is connected to this connecting member.

12 Claims, 7 Drawing Figures

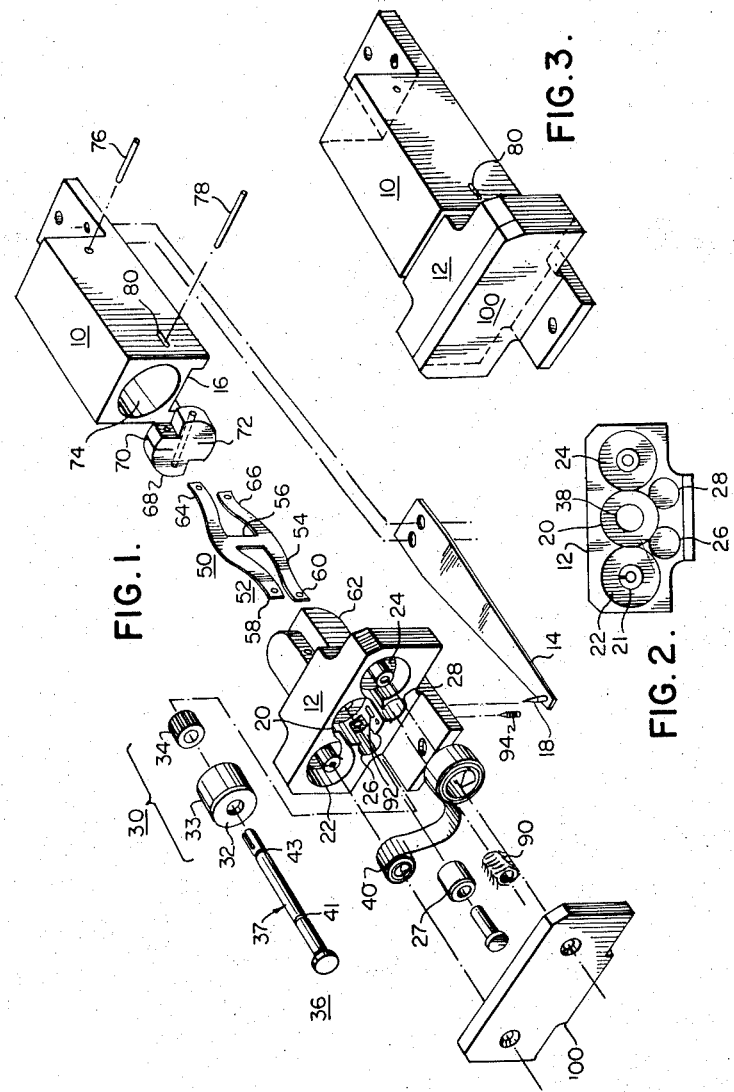

SCRATCH STRAIN RECORDER

GENERAL DESCRIPTION AND DISCUSSION OF PRIOR ART

The present invention relates to a scratch strain recorder which records strain on a tape. The tape is driven through the recorder as a function of the strain recorded and therefore tape is used only when the recorder detects a strain. Since it is desired to make a clean recording of strain the tape is moved in one longitudinal direction only by strain of one sense only. As a result, the tape moves longitudinally while the strain measurement is recorded on the tape transversely. The resultant imprint on the recording tape is in the form of a sawtooth graph with the perpendicular distance of any point on the graph from a reference line being equal to the magnitude of the strain recorded.

A scratch strain recorder of a similar type is described in U.S. Pat. No. 3,430,250 which issued on Feb. 25th, 1969. However, the device disclosed in that patent has several drawbacks which are overcome by the present invention. The recording target on the device according to the above mentioned patent is circular and the information recorded thereon is recorded in a circular path. As a result, the device has a limited recording time, i.e. one rotation of the circular target. In contrast, the present device records strain on a tape which can be provided at any length.

The device according to the above mentioned patent rotates the circular target via the ratcheting action of a pair of resilient multi-stranded metal fingers engaging a cylindrical surface near the outer circumference of the target. A finite minimum strain is required to move one of the fingers far enough to successfully rotate the circular target. If the recorder is subjected to a repeated series of strains below the minimum, the target does not move but the fingers tend to dig into the cylindrical surface so that in order to get the target rotating again a strain is necessary which is considerably larger than the above mentioned minimum strain. As a result, the device according to the above mentioned patent exhibits a non constant "dead space." The device according to the present invention also exhibits a small "dead space," i.e. a minimum level of strain below which transportation of tape is not made, but the dead space is due to slight mechanical lash in the various parts and is always the same in its magnitude. As a result, the device according to the present invention exhibits a constant magnitude "dead space."

The device according to the present invention is comprised of a support assembly which supports a recorder arm in a fixed and rigid manner at one end. The recorder arm is provided at its opposite end with a stylus which either engraves or indents the recording tape. In close proximity to the support assembly there is positioned a recording head assembly which contains cavities for storing the tape both before and after it is recorded. An elongated hole is provided in one portion of the recording head assembly which allows access of the stylus to the recording tape. The support assembly and the recorder head assembly are both secured to a test piece. A strain in the test piece will elongate or foreshorten the test piece and there will be relative movement of the recording head assembly and the support assembly. Since the stylus is fixed via the recorder arm to the support assembly and the tape is held by the recording head assembly, the stylus will mark the tape. The magnitude of the markings will be proportional to the amount of deformation of the test piece which in turn is directly proportional to the strain in the test piece.

So that the markings on the tape are not superimposed on one another it is necessary to move the tape along its longitudinal axis in one direction. In order to conserve tape, the tape is moved as a function of the strain recorded rather than as a function of time.

An H-shaped element is arranged between the support assembly and the recording head assembly. The H-shaped element consists of first and second longitudinal legs connected at their centres by a central connecting portion. The first longitudinal leg is bowed at its centre in one direction and the second longitudinal leg is bowed at its centre in the opposite direction. One end of the first and second longitudinal legs is connected to the recording head assembly and the other end of the first and second longitudinal legs is connected to the support assembly. In operation, when the scratch strain recorder detects a longitudinal strain to be recorded there is relative movement between the support assembly and the recording head assembly. This relative movement creates an increase or a decrease in the bow of the first and second longitudinal legs depending upon the sense of the strain being recorded. The increase or decrease in the bow causes an angular rotation of the central connecting portion of the H-element. A shaft is connected to the central portion of the H-element intermediate to the first and second longitudinal legs and connects with a uni-directional clutch. The output of the clutch, as a result of the interconnection with the clutch and the H-shaped element is a rotation in one direction only as a result of the strain being recorded by the device. This uni-directional rotating motion is fed to a tape transport means which, acting like a capstan, moves the tape in one of its longitudinal directions.

The tape transport means is located in a cavity which is arranged centrally in the recording head assembly. To either side of the tape transport cavity there is arranged a supply and a take-up cavity for the recording tape. The recording tape is loosely wound in the supply cavity and runs through the tape transport means cavity, around the lower portion of the tape drive means, past a recording station to the take-up cavity. The leading end of the tape is secured to a central post in the take-up cavity and is initially, rather tightly wound around the spindle for a few turns. This configuration tends to increase the tape capacity of a scratch strain recorder with a take-up cavity of a fixed dimension and in addition creates, via a spiral spring action of the tape, a force which tends to urge the tape from the supply cavity to the take-up cavity. However, this force is not sufficient to actually move the tape and only aids the tape movement when the tape is also acted upon by the tape transport means. There is also provided a tape brake means which tends to hold the tape from moving back into the supply cavity when the uni-directional clutch is moving in its free direction. This tape brake means consists of, for example a small quantity of a material known as FIBRE-TRAN (Trade Mark) located in a tape brake means cavity located directly adjacent and in communication with the tape transport means cavity to one side of the recording station.

In accordance with the present invention there is provided a scratch strain recorder comprising a support assembly and a recording head assembly, said recording head assembly including a recording tape support means and a recording tape transport means; a recording element comprising an arm and a recorder stylus, one end of said arm being fixed to said support assembly, the other end of said arm carrying said recorder stylus and urging the said stylus against a recording tape at a recording station in said recording head assembly; a rotational drive source means connected between said support assembly and said recording head assembly; said recording tape transport means comprising a uni-directional drive connected at one end to said rotational drive source means and operatively associated at its other end with said tape for transporting said tape in one longitudinal direction past the recording station.

DESCRIPTION OF THE DRAWINGS

The present invention will hereinbelow be described in detail with the aid of the accompanying drawings, in which:

FIG. 1 is an exploded perspective view of a particular embodiment according to the present invention;

FIG. 2 is an end view of the recording head assembly of the embodiment shown in FIG. 1;

FIG. 3 is a perspective view of the embodiment shown in FIG. 1 in its assembled form;

DETAILED DESCRIPTION

Figure 4:
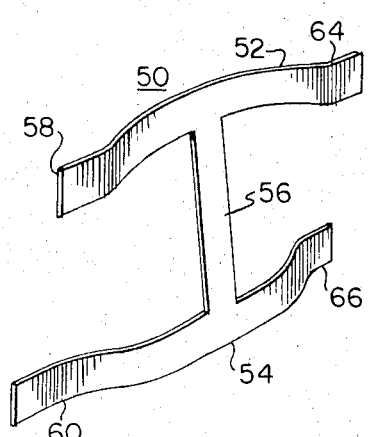
FIGS. 4, 5 and 6 are perspective views of three different embodiments of the rotational drive source means which can be used in the embodiment shown in FIG. 1.

With reference to FIG. 1, the scratch strain recorder of the particular embodiment is comprised of two main assemblies, the support assembly 10 and the recording head assembly 12. A recorder arm 14 is fixed in a rigid manner at one end to the support assembly 10 and is free to flex in a channel 16 formed in the underside portion of the support assembly 10. The other end of the recorder arm 14 is fitted with a stylus 18.

The recording head assembly 12 made preferably from a solid block of metal has formed therein five cavities 20, 22, 24, 26 and 28 (also seen in FIG. 2). The cavity 20 is a transport means cavity and it is located centrally in the recording head assembly. The tape transport drive 30, shown in FIG. 1, is mounted within the cavity 20. The tape transport drive means comprises an outer portion 32, the outer cylindrical surface 33 of which acts as a tape drive similar to a capstan drive. The outer portion 32 is connected via a uni-directional clutch mechanism 34 to a shaft 36, the assembled arrangement providing a uni-directional clutch drive and a tape transport means for example, a type DF45877 clutch made by the Torrington Company can be used. The shaft 36 passes through the inner portion of the uni-directional clutch mechanism 34 and when assembled passes through a hole 38 (FIG. 2) in the recording head assembly forming a bearing surface 37 with the recording head assembly. A slotted end of the shaft is slidingly connected with a rotational drive source means 50 which will be described in detail below.

Cavity 24 in the recording head assembly is the supply cavity for the tape 40. The supply cavity 24 is arranged to one side of the transport means cavity 20 and is in communication with it. A take-up cavity 22 is arranged on the other side of the tape transport means cavity 20. Take-up cavity 22 is also in communication with the tape transport means cavity. The recording tape 40 is loosely wound in supply cavity 24, is fed into transport means cavity 20, is positioned along the lower surface of the cylindrical surface 33 of the tape transport means and is fed into the take-up cavity 22. The leading end of the tape is connected to a post 21 in the take-up cavity 22. When the tape is initially loaded into the scratch strain recorder it is loosely wound in the supply cavity 24 and a suitable number of turns are tightly wound around post 21 and the leading end of the tape fastened thereto. The tightly wound turns in the take-up cavity 22 try to expand and loosen and as a result there is a force on the tape which tends to urge the tape from the supply cavity 24 to the take-up cavity 22. This force is not actually strong enough to move the tape but it tends to move the tape when aided by the tape transport means.

With reference to FIG. 4, the tape transport means moves the tape as a function of strain being recorded by the scratch strain recorder. Its rotational drive power is obtained from a rotational drive source means comprising an H-element 50. The H-element 50 is comprised of first and second longitudinal legs 52 and 54 respectively. These legs are interconnected at their centres by a connecting portion 56. The first longitudinal leg is bowed at its centre in one transverse direction and the second longitudinal leg is bowed at its centre in the opposite transverse direction. The ends 58 and 60 of the first and second longitudinal legs are connected to a cantilever portion 62 of the recording head assembly. The other ends 64 and 66 of the first and second longitudinal legs are connected in slots 70 and 72 of a supporting disc 68 by suitable fastening means not shown. The support assembly 10 has located therein a central cavity 74. The supporting disc 68 is situated within the cavity 74 and is securely connected to the support assembly 10 via pin 76. In its assembled configuration the cantilevered portion 62 of the recording head assembly also fits within the cavity 74 in a sliding manner. To limit the movement of the recording head assembly 12 with respect to the support assembly 10 a pin 78 is fitted to the cantilevered section 62 via the elongated slot 80 in the support assembly 10. Relative movement of the support assembly with respect to the recording head assembly causes the bows in the central portions of longitudinal legs 52 and 54 of the H-element to increase and decrease respectively. The increase or decrease in the bow of the legs rotates the central portion 56. As a result, angular motion is derived in the central portion 56 of the H-element due to linear longitudinal relative motion of the support assembly 10 and the recording head assembly 12. One end of the shaft 36 is slotted and connects the central portion 56 intermediate to the two longitudinal legs 52 and 54. Rotational motion in both directions of the central portion 56 are thereby transmitted to the shaft 36. Since the shaft 36 passes through the inner portion of the clutch assembly 34, rotational motion in one direction only is transmitted to the outer portion 32 of the clutch assembly and tape drive transport means 30. As a result, the outer surface 33 of the tape transport means moves in one rotational direction as a result of the recording head assembly moving longitudinally with respect to the support assembly in one sense. When the recording head assembly moves longitudinally with respect to the support assembly in the opposite sense, no movement of the tape transport means occurs.

The H-element according to FIG. 4 is preferably but not necessarily made from flat material.

Figure 5:
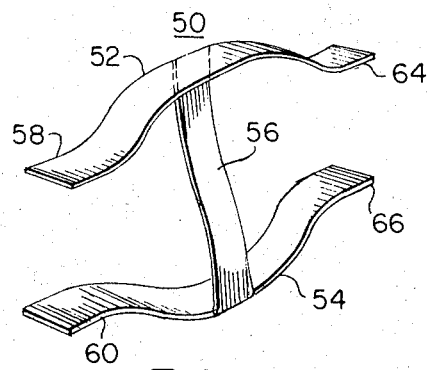

A second embodiment of the H-element is shown in FIG. 5. The embodiment of FIG. 5 is the same as that of FIG. 4 made from flat material but with the first and second longitudinal legs folded by approximately 90° in opposite directions with respect to the central portion 56. An end view of the embodiment shown in FIG. 5 would form a Z-shaped structure. This configuration facilitates the connection of the ends 58 and 60 to the cantilevered portion 62 of the recording head assembly 12 and the ends 64, 66 to the supporting disc 68. If the H-element embodiment shown in FIG. 5 is used, it is not necessary to provide slots 70, 72 in the supporting disc. The legs can merely be fastened to the circumference of the disc.

Figure 6:
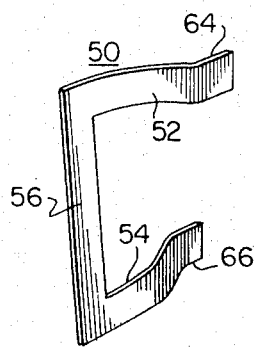

FIG. 6 is a third embodiment of a rotational drive source means which can be utilized with the scratch strain recorder according to FIG. 1. In the embodiment shown in FIG. 6, the longitudinal legs 52 and 54 are shortened by removing those portions which connect the rotational drive source means to the cantilever portion 62 of the recording head assembly 12 as shown in FIGS. 4 and 5. The resulting shape of the element is in the form of a U, with the ends 64 and 66 being connected to the supporting disc 68. The connecting portion 56 is securely connected to the shaft 36 (shown in FIG. 1) which in turn is securely connected in the portion 37 with the recording head assembly 12 against longitudinal movement with respect to the recording head assembly. This can be done by providing clips (not shown) in the grooves 41 and 43 in the shaft 36. In the assembled configuration, the clips are positioned on the shaft on either side of the recording head assembly 12. When relative longitudinal motion of the support assembly 10 and the recording head assembly 12 takes place, the longitudinal legs 52 and 54 increase or decrease their bowed shape and the connecting portion 56 rotates. As before, since the shaft 36 is securely connected to the connecting portion 56 it rotates, thereby transmitting rotational motion to the tape drive means via uni-directional clutch assembly 30. If the rotational drive source means shown in FIG. 6 is used in the embodiment shown in FIG. 1, the cantilever portion 62 can be somewhat shortened since it is no longer used to support one end of the rotational drive source means.

Referring again to FIGS. 1 and 2, cavity 26 in the recording head assembly contains a pressure roller 27 running against the recording tape 40 forcing the recording tape 40 against the cylindrical surface 33 of the capstan drive. As a result, the tape, in response to a strain in one sense is moved from the tape supply cavity 24 to the take-up cavity 22 past the recording station. When a change in strain in the opposite sense is detected by the scratch strain recorder the H-element transmits rotational motion to the shaft 36 but the uni-directional clutch means 30 comes into play and refrains from rotating the capstan in a direction which would move the recording tape from the take-up cavity 22 back into the supply cavity 24. To ensure that the recording tape 40 does not move back into the supply cavity 24, a tape drive brake 90 is fitted into a tape brake cavity 28. The tape brake 90 is comprised of a material known as FIBRE-TRAN (Trade Mark). FIBRE-TRAN (Trade Mark) consists of NYLON (Trade Mark) fibers which are securely mounted in a thin flexible backing at approximately 60°. Movement of the tape 40 in one direction causes the fibers to straighten thereby expanding the FIBRE-TRAN (Trade Mark) material within the brake cavity 28. This expansion tends to squeeze the tape 40 against the surface 33 which successfully brakes the tape against movement into the supply cavity 24. Movement of the tape 40 in the opposite direction smooths the fibers against the backing and allows free sliding action of the tape.

An elongated hole 92 is arranged in the lower portion of the recording head assembly communicating the tape transport means cavity with the lower portion of the recording head assembly. The stylus 18 fits through the elongated hole 92 and contacts the recording tape 40 which is arranged along the lower region of the tape transport means surface 33. Also included in the lower portion of the recording head assembly is a reference stylus 94. This stylus is fixed to the recording head assembly and continuously scribes the recording tape 40 thereby marking a reference on the tape. This reference can be used in conjunction with the strain recording to compensate for any tape side-play that is obtained when the tape is transported past the recording station during recording.

A cover plate 100 is fixed to the recording head assembly 12 to protect the tape and the tape advance and record mechanism from the environment during operation of the scratch strain recorder. The cover plate may be fastened to the recording head assembly in any suitable manner.

Figure 7:
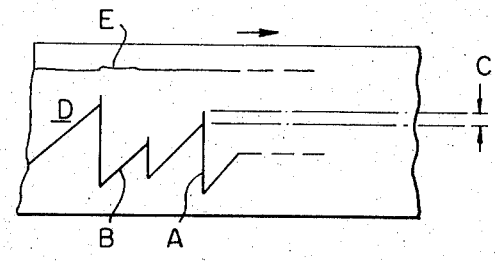
FIG. 7 is a portion of the recording tape used in the embodiment shown in FIG. 1.

The markings on the tape can best be seen in FIG. 7 which shows a portion of recorded tape. The recording tape is moved in its longitudinal axis by the tape transport means in the direction of the arrow. Actual strain recordings are indicated generally by the line D. Looking in more detail at line D, the transverse line A indicates a strain in one sense and its length is proportional to the change in strain. Strain changing in the sense indicated by A is such that angular rotation of the central portion 56 generated by the strain is disengaged from the tape drive transport means by the clutch assembly 30. Line B of FIG. 7 indicates a strain changing in the opposite sense to that recorded by line A. Angular rotation generated at the central portion 56 of the H-element 50 by this changing strain is transmitted through the clutch to the tape drive means and moves the tape along its longitudinal axis in the direction of the arrow. The transverse distance between any two points on line B is proportional to the change in strain. The dimension C appearing in FIG. 7 indicates the "dead space" which as mentioned earlier exists because of small backlash in the drive mechanism. A finite amount of angular movement of the shaft 36 is necessary before the outer portion 32 of the uni-directional clutch begins to move. Similarly, when the clutch is moved in its opposite direction there is a slight drag on the tape 40 which tends to move the tape 40 from the take-up cavity 22 to the supply cavity 24. However, the tape braking mechanism 90 comes into play and holds the tape from moving back into the supply cavity 24.

A line E is marked on the tape by the reference stylus 94. The line E can be used to correct the marking D on the tape in the event that there is a small transverse movement of the tape 40. As mentioned above, a change in strain is proportional to the transverse distance between any two points on the graph, which, of course, represent the magnitude of the relative movement of the support assembly 10 and the recording head assembly 12. If there is a transverse displacement of the line E at any such point or points then that transverse displacement indicates a transverse movement of the tape and its magnitude must be taken into consideration when calculating the actual magnitude of the relative longitudinal movement between the support assembly 10 and a recording head assembly 12.

What I claim as my invention is:

1. A scratch strain recorder comprising a support assembly and a recording head assembly, said recording head assembly including a recording tape storage means and a recording tape transport means; a recording element comprising an arm and a recorder stylus, one end of said arm being fixed to said support assembly, the other end of said arm carrying said recorder stylus and urging said stylus against a recording tape at a recording station within said recording head assembly; a rotational drive source means connected between said support assembly and said recording head assembly; said recording tape transport means comprising a uni-directional drive connected at one end to said rotational drive source means and operatively associated at its other end with said tape for transporting said tape in one longitudinal direction past said recording station; said uni-directional drive source means comprising a shaft, one end of which is slotted to slidingly couple with said uni-directional drive source means; a cylindrical outer assembly arranged over the other end of said shaft, said outer assembly having an outer cylindrical surface in contact with and for driving said recording tape along its longitudinal axis; and a cylindrical clutch element interposed between said shaft and said outer assembly, said cylindrical clutch element jamming between said shaft and said outer assembly under the influence of rotation of said shaft in one direction to thereby transmit torque from said shaft to said outer assembly, said cylindrical clutch lossening between said shaft and said outer assembly under the influence of rotation of said shaft in the opposite direction.

2. A scratch strain recorder according to claim 1 wherein said recording tape transport means is located within a recording tape transport means cavity which is located within said recording head assembly, a portion of said cavity enclosing said recording station.

3. A scratch strain recorder according to claim 2 wherein said recording head assembly further includes a pressure roller rotatably mounted in a pressure roller cavity which is in communication with said recording tape transport means cavity, said pressure roller supporting said tape at a location directly adjacent said recording station, and a uni-directional tape brake means located in a uni-directional tape brake means cavity which is in communication with said recording tape transport means cavity, said tape brake means being in contact with said tape at a location directly adjacent said recording station.

4. A scratch strain recorder according to claim 1 wherein said recording tape storage means comprises a take-up cavity and a supply cavity, each being located in said recording head assembly and each being in communication with said recording tape transport means cavity, wherein said recording tape is wound within said supply cavity and initially tightly wound and secured at one end to a centrally located spindle within said take-up cavity, thereby leaving initially a substantial empty space within said take-up cavity for the recording tape, and providing a force on the tape which tends to urge said tape to travel from said supply cavity to said take-up cavity.

5. A scratch strain recorder according to claim 4 wherein said take-up cavity and said supply cavity are located on opposite sides of said recording tape transport means cavity.

6. A scratch strain recorder according to claim 1, wherein said rotational drive source means comprises an H-shaped element having first and second longitudinal leg portions and an integral central connecting portion; one end of each of said first and second longitudinal leg portions being secured to the recording head assembly, the other ends of said first and second longitudinal leg portions being secured to the support assembly, said first leg portion being centrally and transversely bowed in a first direction and said second leg portion being centrally and transversely bowed in a second opposite direction so that a relative longitudinal movement of said support assembly and said recording head assembly causes an angular rotational movement of said central portion.

7. A scratch strain recorder according to claim 6, wherein said first and second longitudinal leg portions and said central connecting portion are made from flat material and wherein said first flat longitudinal leg portion is bent substantially 90° with respect to said flat central portion in one direction and wherein said second flat longitudinal leg portion is bent substantially 90° with respect to said flat central portion in the opposite direction.

8. A scratch strain recorder according to claim 1, wherein said outer assembly has a smooth cylindrical outer surface which is the tape transport means which is situated in said tape transport means cavity, said smooth cylindrical outer surface contacting said tape to move said tape in response to said angular rotation movement in one direction only.

9. A scratch strain recorder according to claim 1, wherein said rotational drive source means comprises a U-shaped element having first and second flat longitudinal leg portions and a connecting end portion, said first and second flat longitudinal legs being bent in opposite transverse directions, said first and second longitudinal legs each having an end connected to said support assembly said connecting end portion being centrally secured to said uni-directional drive so that a relative longitudinal motion of said support assembly and said recording head assembly causes an angular rotational movement of said connecting end portion.

10. In a scratch strain recorder a rotational drive source means comprising an H-shaped element having first and second longitudinal leg portions and an integral central connecting portion, said first longitudinal leg portion being centrally and transversely bowed in one direction, said second longitudinal leg portion being centrally and transversely bowed in a second opposite direction, wherein opposite ends of said first and second longitudinal leg portions are respectively connected to first and second pre-determined points on a workpiece in which strain is to be measured so that changes in strain cause a reciprocating and opposite longitudinal motion of said opposite ends of said first and second longitudinal leg portions, thereby inceasing and decreasing the bow of said first and second longitudinal leg portions causing an alternating rotational motion of said central portions; uni-directional drive means connected to said central portion to thereby produce a uni-directional rotating motion for driving a recording medium.

11. In a scratch strain recorder according to claim 10, wherein said first and second longitudinal leg portions and said central connecting portion are made from flat material and wherein said first flat longitudinal leg portion is bent substantially 90° with respect to said flat central portion in one direction and wherein said second flat longitudinal leg portion is bent substantially 90° with respect to said flat central portion in the opposite direction.

12. In a scratch strain recorder a rotational drive source means comprising a U-shaped element having first and second flat longitudinal portions and an integral flat connecting end portion, said first and second flat longitudinal leg portions being bowed in opposite transverse directions, wherein said connecting end portion is connected to a first pre-determined point on a workpiece in which strain is to be measured and wherein the free ends of said first and second longitudinal leg portions are connected to a second predetermined point on said workpiece, so that changes in strain cause a reciprocating and opposite longitudinal motion of the connecting end portion and the free ends thereby causing an increase and a decrease in said bow and thereby an ultimating rotational motion of said connecting end portion; uni-directional drive means connected to said central end portion to thereby produce a uni-directional rotating motion for driving a recording medium.

* * * * *